Aug. 23, 1938.　　P. H. BATTEN ET AL　　2,127,713
CLUTCH MECHANISM
Filed May 21, 1937　　4 Sheets-Sheet 1

Inventors.
Percy H. Batten and
Henry J. Dunkelow.
Davis, Lindsey, Smith & Shonts Aug. 23, 1938.  P. H. BATTEN ET AL  2,127,713

CLUTCH MECHANISM

Filed May 21, 1937  4 Sheets-Sheet 3

Inventors:
Percy H. Batten and
Henry J. Dunkelow.

by Davis, Lindsey, Smith & Shonts
Attys.

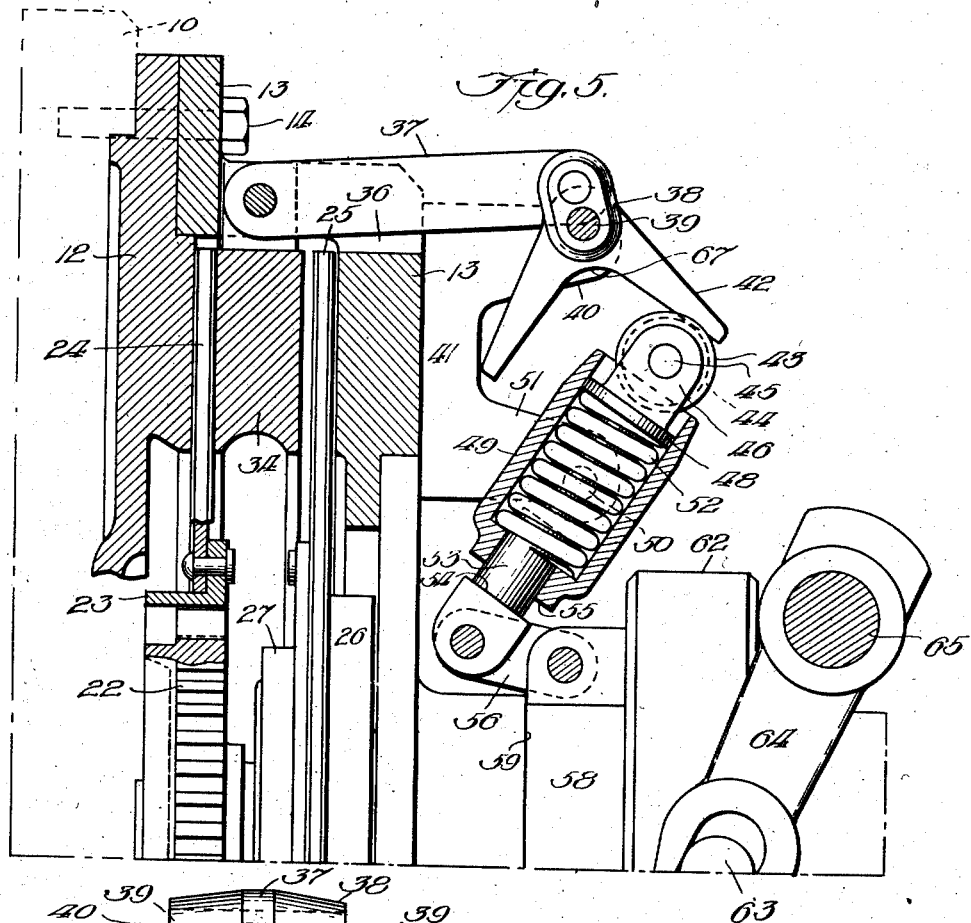

Patented Aug. 23, 1938

2,127,713

UNITED STATES PATENT OFFICE 2,127,713

CLUTCH MECHANISM

Percy H. Batten and Henry J. Dunkelow, Racine, Wis., assignors to Twin Disc Clutch Company, Racine, Wis., a corporation of Wisconsin Application May 21, 1937, Serial No. 143,877

14 Claims. (Cl. 192—48)

Our invention relates to a clutch mechanism for effecting a transmission of power between driving and driven shafts and is more particularly concerned with providing a mechanism of this character of the spring-loaded type.

For purpose of illustration, our improved mechanism is disclosed in operative relation to an arrangement of reducing gearing for directly and reversely driving a part, such as a marine propeller, and includes a pair of clutches having a common clamping plate which is spring loaded when either clutch is engaged, the clutches and plate being mounted in an enclosing casing. To this extent, our invention is similar to the mechanisms disclosed and claimed in United States Letters Patent Nos. 2,077,663, dated April 20, 1937, and 2,125,433, dated August 2, 1938, respectively.

One object of the present invention is to provide an improved operating means for engaging either of the clutches and for applying spring pressure to the clamping plate.

A further object is to devise a clutch mechanism in which the springs are arranged for an efficient transmission and distribution of pressure to and around the clamping plate, the transmission being effected through devices which provide for an amplification of the total pressure exerted by the several springs.

A further object is to provide a mechanism in which the separate clutches are spring-loaded and held in their respective driving positions by the operation of shifting the common clamping plate into either operative position, the plate being additionally maintained in the neutral position by the loading springs, and the several clutch elements being entirely enclosed to thereby enable the use of dry plate clutches.

These and further objects of our invention will be set forth in the following specification, reference being had to the accompanying drawings, and the novel means by which said objects are effectuated will be definitely pointed out in the claims.

In the drawings:

Fig. 5 is a view similar to Fig. 3, but showing the operating mechanism shifted to a position that engages the forward drive clutch; and Fig. 6 is a section along the line 6—6 in Fig. 3, looking in the direction of the arrows, and showing the manner in which each operator is supported on the casing that encloses the several clutch parts.

Figure 1:
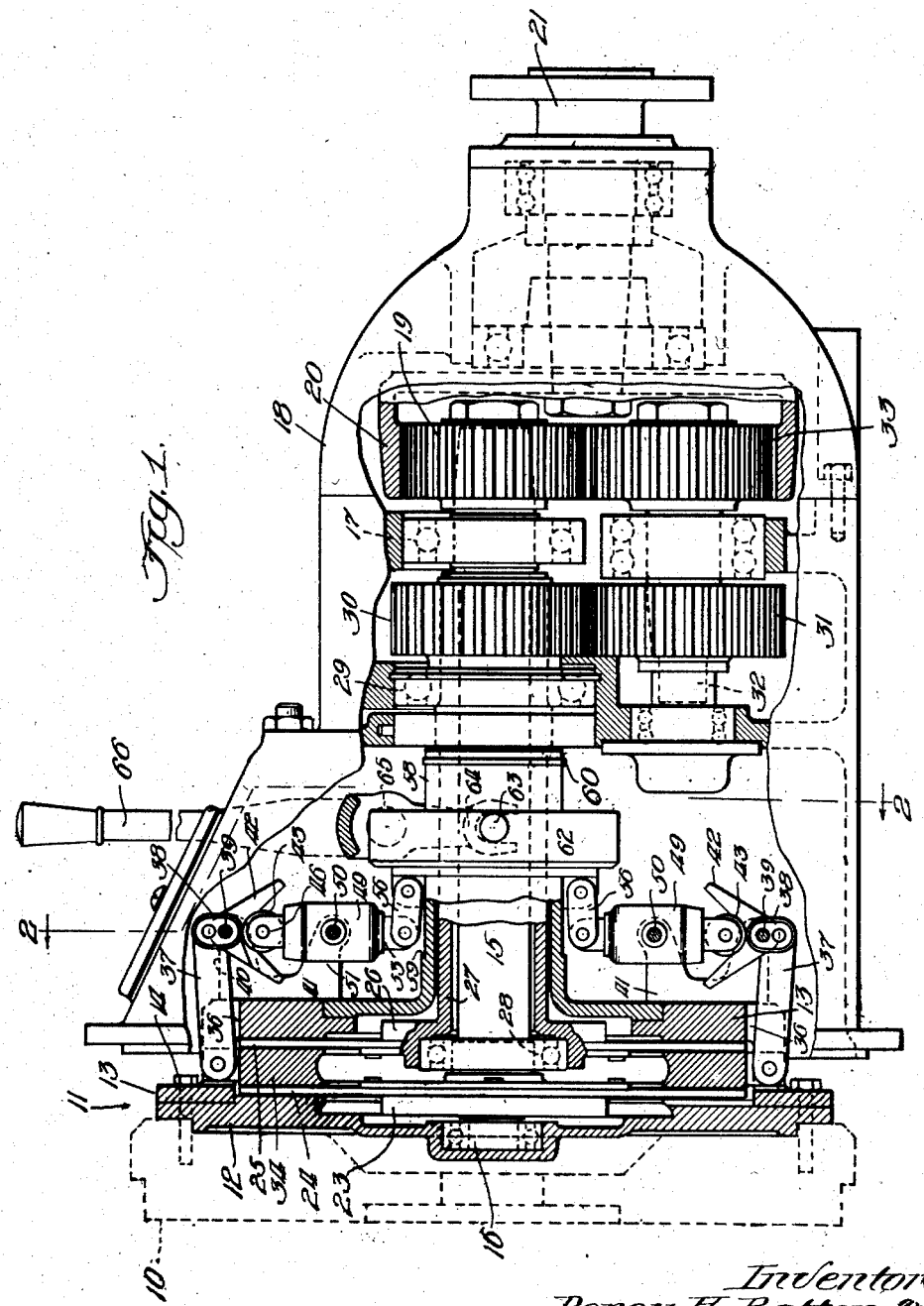
Figure 1 is an elevation, partly in section, of our improved mechanism as viewed along the line 1—1 in Fig. 2, looking in the direction of the arrows, the mechanism being shown in connection with a reversing gear, such as is commonly employed for marine installation.
Figure 2:
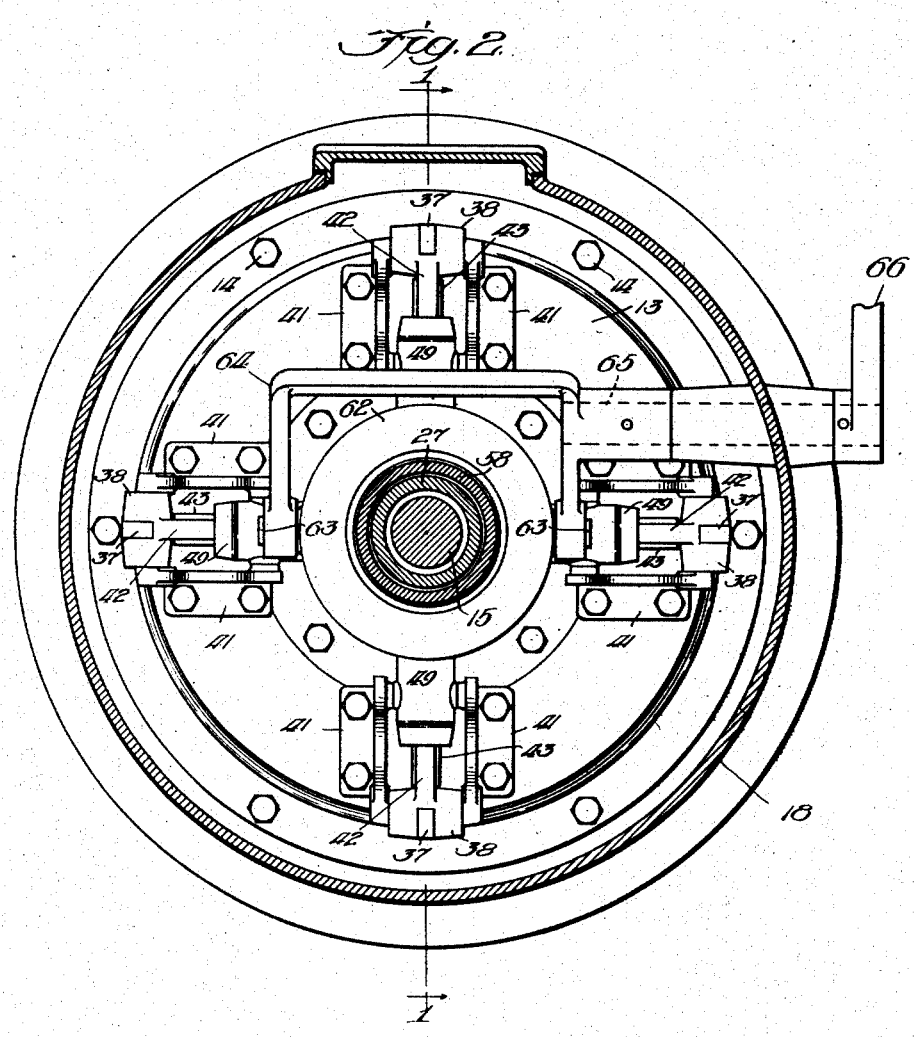
Fig. 2 is a section along the line 2—2 in Fig. 1, looking in the direction of the arrows.
Figure 3:
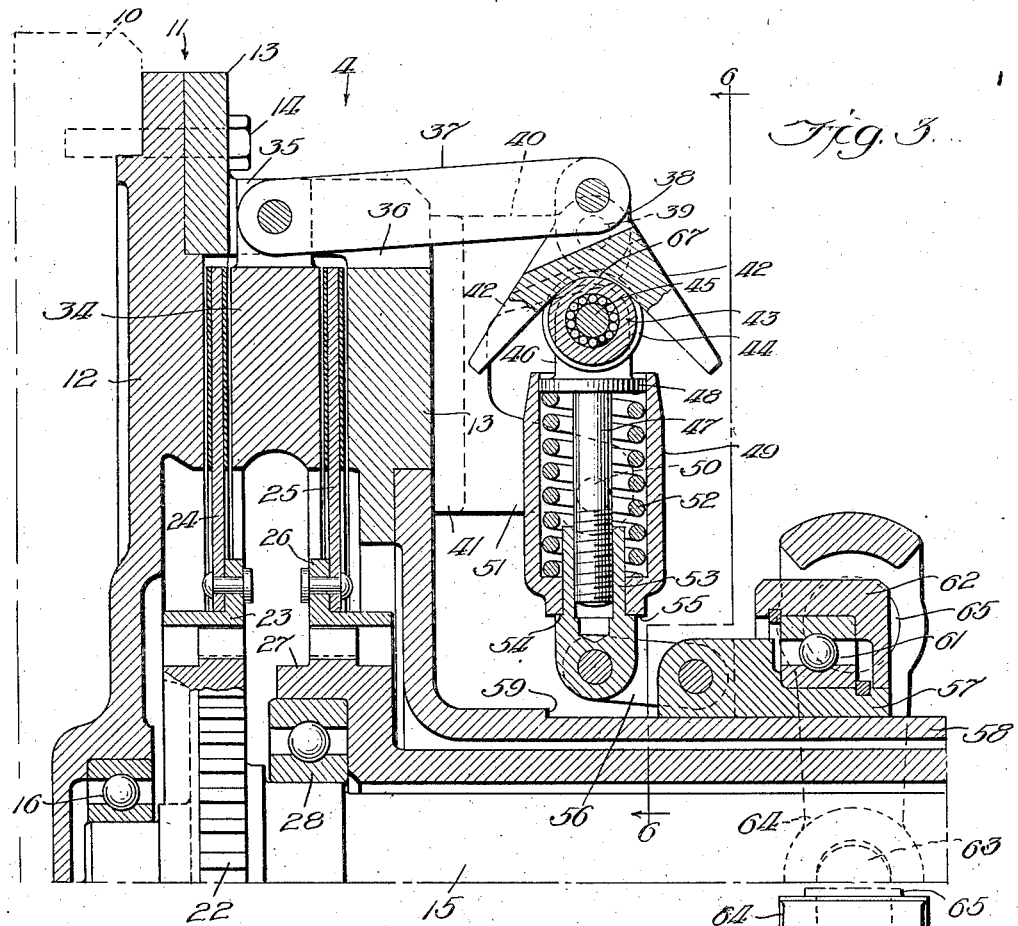
Fig. 3 is a fragmentary, enlarged, sectional elevation of the mechanism illustrated in Fig. 1, showing the positions of the clutch devices and one operator therefor when the mechanism is in neutral position.

Referring to Figs. 1 and 3, the numeral 10 designates a driving member, such as a flywheel, which is suitably connected to a power source (not shown). A clutch casing 11 composed of the separable, complementary parts 12 and 13 is secured to one face of the flywheel by bolts 14.

One end of a direct drive shaft 15 is journaled in a bearing 16 carried by the casing part 12 and located in axial alignment with the axis of the flywheel, while adjacent the opposite end, the shaft is journaled in a bearing 17 that is mounted in a main housing 18 which encloses the clutch and gear mechanism hereinafter described. A pinion 19 is keyed or otherwise fixedly attached to the shaft 15 and is in constant mesh with an internal, driven shaft gear 20 that is secured to a driven shaft 21.

The shaft 15 is provided with an externally toothed, annular flange 22 that is in constant mesh with similar teeth provided on the inner periphery of a ring 23 to which is secured a friction disc 24 whose opposite faces may be provided with suitable friction material. The disc 24 is located adjacent the inner face of the casing part 12 and a similar friction disc 25 is located adjacent the inner face of the casing part 13. The disc 25 is secured to a ring 26 whose inner periphery has toothed driving engagement with a reverse drive sleeve 27 that surrounds and is concentric with the shaft 15. The sleeve is supported entirely clear of contact with the shaft by means of a bearing 28 at one end that is carried by the shaft 15 and adjacent the opposite end by a bearing 29 that is mounted in the housing 18. Accordingly, the sleeve is freely rotatable relative to and independently of the direct drive shaft 15 and secured to the sleeve is a pinion 30 that is in constant mesh with a gear 31 fast on a countershaft that is suitably journaled in the housing 18. A pinion 33 is also secured to the countershaft and permanently meshes with the internal gear 20 on the opposite side of the axis of the shaft 21 from the pinion 19, thus providing the maximum space for the reception of the last-noted pinion.

From the foregoing, it will be understood that the shaft 15 and sleeve 27 constitute elements for transmitting direct and reverse drives, respectively, to the gearing described and that the connection of these parts with the flywheel 10 is respectively provided by a direct drive clutch defined by the clutch part 12 and friction disc 24, and a reverse drive clutch defined by the clutch part 13 and friction disc 25. A common clamping member or plate 34 is provided for these clutches and is located between the discs 24 and 25. Driving engagement between the plate 34 and the clutch casing is obtained by means of a plurality of circumferentially spaced lugs 35 which extend outwardly from the periphery of the plate 34 through similarly spaced slots 36 cut in the periphery of the clutch part 13. In the present construction, these clutches are of the dry plate type as permitted by the use of the enclosed clutch casing, but the mechanism may also be designed to provide for an operation of these clutches in oil spray or a dipping in oil, as circumstances may require.

As shown in Figs. 1 and 3, the clutches are occupying a neutral position and the distance between the opposed faces of the casing parts 12 and 13 is such that, when the clamping plate 34 is occupying the intermediate position shown, the friction discs 24 and 25 may freely accommodate themselves by an axial movement to occupy positions out of contact with the faces of the plate 34 and the casing parts 12 and 13.

The manner in which the foregoing clutches are selectively engaged will now be described. The engagement of the clutches is effected through a plurality of operators which are equi-spaced around the shaft 15 and, since each of the operators possesses an identical construction, it will only be necessary to discuss one of them in detail. As many of these operators may be employed as circumstances require and, for example, four of these operators are shown.

Figure 4:
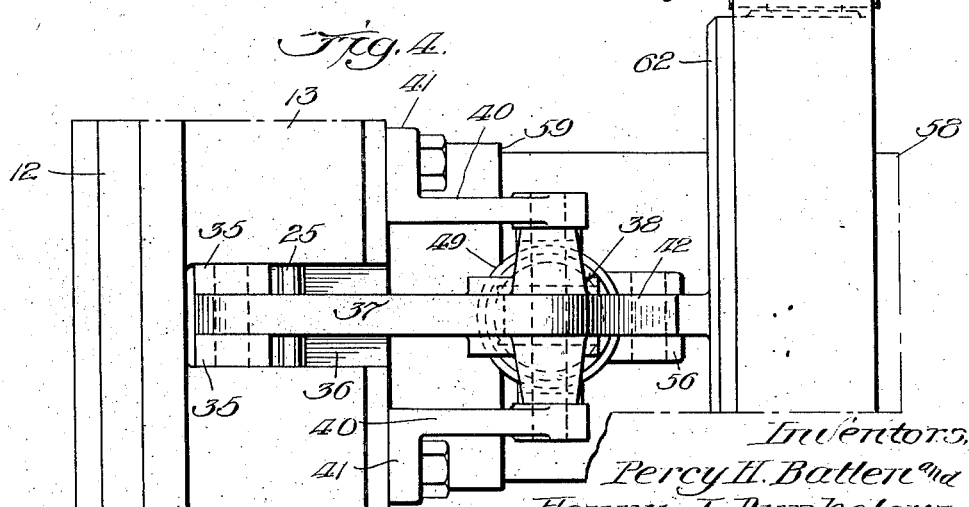
Fig. 4 is a plan view of the operator shown in Fig. 3, looking in the direction of the arrow 4 in said figure.

Referring more particularly to Figs. 3 and 4, the driving lug 35 is intermediately slotted to pivotally receive one end of a link 37 that projects toward the right, as viewed in Fig. 3, through the slot 36 for pivotal connection to one arm of a lever 38 that is pivoted on a pin 39 bridged between a pair of upper arms 40 provided on a bracket 41 that is fastened to the clutch casing part 13. Radially inward of the pivot pin 39, the lever 38 is provided with a pair of divergent arms 42 whose inner faces are substantially perpendicular to each other and which are symmetrically disposed on opposite sides of a line connecting the center of the pivot pin 39 with the center of the pin which connects the link 37 to the lever 38.

A roller 43 having a peripheral groove 44 is positioned between the arms 42 and the inner faces of these arms are intended to bear against the bottom of the groove so as to establish a definite guiding relation between the arms and the roller when the latter is rocked as hereinafter described. The roller 43 is freely rotatable on a pin 45 that is bridged between a pair of ears 46 provided on the upper end of a stem 47. This stem also includes a circular flange 48 that slidably fits within a spring cup 49 which is pivoted on trunnion pins 50. These pins are journaled in a lower pair of arms 51 also provided on the bracket 41.

A helical spring 52 encircles the stem 47, the lower end of this spring abutting against the bottom of the spring cup and the upper end against the under side of the guiding flange 48. Accordingly, the spring always acts in a direction to maintain the roller 43 in contact with both arms 42, when the operator occupies the position illustrated in Fig. 3, or with either one of these arms, dependent upon which clutch is engaged.

The lower end of the stem 47 is threaded into a sleeve 53 that is slidable through the lower end of the spring cup 49 and this sleeve is provided with a shoulder 54 which engages a shoulder 55 formed on the lower end of the spring cup to thereby limit the outward, radial movement of the stem 47.

A pair of links 56 embrace and are pivotally connected to the lower end of the sleeve 53 and the opposite ends of these links are also pivotally secured to a sleeve 57 that encircles and is slidable along a tubular extension 58 that is appropriately secured to the casing part 13. Endwise movement of the sleeve 57 towards the left, is limited by a shoulder 59 formed on the extension 58 and, towards the right, by a stop ring 60 mounted on the extension.

A ball bearing 61 encircles the sleeve 57 and is in turn encircled by a collar 62 having a pair of laterally extending trunnion pins 63 and these pins are engaged by a pair of bifurcated arms formed on an operating lever 64 that is secured to an operating shaft 65. This shaft is suitably journaled in the housing 18 and on the outer, projecting end of this shaft is mounted an operating handle 66.

The operation of our improved clutch mechanism will now be described. Referring to Fig. 1, it will be assumed that the flywheel 10 and hence the clutch casing 11 are rotating at some determined speed, and that the clamping plate 34 occupies the neutral position shown. In this position, the roller 43 is seated in the curved portion 67 of the lever 38 formed by the junction of the inner faces of the diverging arms 42 and these arms are symmetrically positioned with respect to the axis of the stem 47. At this time, the spring 52 is under minimum compression, but exerts sufficient pressure against the flange 48 to maintain the roller 43 in the position illustrated in Fig. 3, corresponding to an intermediate or neutral position of the clamping plate 34. Since, in the present instance, four of these operators are employed, it will be evident that the force, due to the extending action of the several springs, will be appropriately and equally applied to and around the clamping plate 34. Moreover, it will be noted that while the clutch casing and the associated operators are rotating with the flywheel, the arms of the operating lever 64 permit this rotation by reason of the association of the operating collar 62 with the outer race of the ball bearing 61.

If now it is desired to transmit a direct drive to the driven shaft 21, the operating handle 66 will be rocked in a clockwise direction, as viewed in Fig. 1, to thereby shift the sleeve 57 along the tubular extension 58 towards the left, as viewed in Fig. 3. Each of the spring cups 49 is therefore rocked in a clockwise direction and the roller 43 begins to move along an arc towards the axis of the shaft 15. This movement of the roller 43 obviously rotates the lever 38 in a counterclockwise direction due to the bearing contact with the right hand lever arm 42. Hence, each of the links 37 is shifted towards the left, as viewed in Fig. 3, to thereby move the clamping plate 34 to grip the friction disc 24 therebetween and the casing part 12, thus engaging the direct drive clutch of the mechanism.

The shifting of the sleeve 57 ordinarily continues until the left end thereof abuts against the shoulder 59 and, at this time, the operator occupies the position substantially as illustrated in Fig. 5, that is, the roller 43 has been shifted inwardly to further compress the spring 52 and the reaction therefrom provides the required spring loading on the clamping plate 34.

In the position of the spring cup, as illustrated in Fig. 5, the axis of the stem 47 is substantially normal to the inner face of the right hand lever arm 42, so that the tendency of the clamping plate 34 to be thrown out of engagement is transmitted directly through the trunnion pins 50. Hence, there is no rocking force applied to the spring cup which would return it to the position illustrated in Fig. 3 and the clutch is held in the driving position described merely by the operation of moving the clutch into engagement. The clutch would also be held in driving engagement even though some situation might arise that would prevent the sleeve 57 from reaching its final position, i. e., in engagement with the shoulder 59, because the shift in position of the roller 43 from that illustrated in Fig. 5 would be so slight that substantially the same conditions as those described above would obtain.

This arrangement also provides for automatic compensation for wear of the friction facings on the disc 24, since within the range of adjustment of the operator, the springs automatically take up the wear in the facings.

With the left hand or direct drive clutch in engagement, the drive from the flywheel 10 is transmitted through the clutch casing 11, clamping plate 34, friction disc 24, direct drive shaft 15, pinion 19 and gear 20.

In order to effect a reverse drive, the operating handle 66 is rocked in a counter-clockwise direction to thereby shift the sleeve 57 towards the right, as viewed in Fig. 3, and thus, through the associated operators, move the links 37 towards the right. The action of each operator is then identical with that which obtains during the engagement of the direct drive clutch, except that the spring cup 49 is rocked in a counter-clockwise direction to thereby engage the roller 43 with the left hand lever arm 42. For reasons already noted, the reverse drive clutch will be held in the engaged position. The limit of movement of the sleeve 57 towards the right is determined by the stop ring 60. In this position of the parts, the drive from the flywheel 10 is transmitted through the clutch casing 11, clamping plate 34, friction disc 25, reverse drive sleeve 27, pinion 30, gear 31 and pinion 33 to the driven shaft gear 20.

The foregoing mechanism may be embodied in an arrangement that is quite compact and in which the loading springs for the respective clutches are utilized to maintain either clutch in driving engagement and also the common clamping plate therefor in neutral position. Moreover, because the respective clutches are engaged by the simple operation of rocking the operators from one position to another, the clutches may be thrown into engagement free of any tendency to grab or jerk. The construction of each operator is such as to obtain any desired amplification of the pressure exerted by the springs so as to obtain the required spring loading of the clutch. Finally, while clutches employing single friction plates have been illustrated, it will be understood that the invention is also capable of adaptation to multiple disc clutches.

We claim:

1. In clutch mechanism, the combination of clutch devices connected to separate rotary parts, a clamping member connected to one of the devices and shiftable to drivably connect both devices, a lever pivoted on one of the devices and connected to the member, spring actuated means rockable on the last-named device and engageable with an arm of the lever, the arm being angularly disposed to the thrusting direction of the means, and means for rocking the spring actuated means to thereby move the lever and shift the member to engage the devices.

2. In clutch mechanism, the combination of clutch devices connected to separate rotary parts, a clamping member connected to one of the devices and shiftable to drivably connect both devices, a lever pivoted on one of the devices and connected to the member, slidable means rockable on the last-named device, spring means abutting on the last-named device and acting to maintain the slidable means in contact with an arm of the lever, the arm being angularly disposed to the thrusting direction of the slidable means, and means for rocking the slidable means to thereby load the spring means and actuate the lever to shift the member to driving position.

3. In clutch mechanism, the combination of clutch devices connected to separate rotary parts, a clamping member connected to one of the devices and shiftable to drivably connect both devices, a first lever pivoted on one of the devices and connected to the member, a second lever pivoted on the last-named device and having a part shiftable relative thereto, spring means abutting on the second lever and acting to maintain the part in contact with an arm of the first lever, and means for operating the second lever to thereby load the spring means and actuate the first lever to shift the member to driving position.

4. In clutch mechanism, the combination of clutch devices connected to separate rotary parts, a clamping member connected to one of the devices and shiftable to drivably connect both devices, a pair of levers pivoted on one of the devices, one of the levers being connected to the member and the other lever having a part shiftable relative thereto, spring means abutting on said other lever and acting to maintain the part in contact with an arm of that lever which is connected to the member, and means for moving one of the levers relative to the other to thereby load the spring means and shift the member to driving position.

5. In clutch mechanism, the combination of clutch devices connected to separate rotary parts, a clamping member connected to one of the devices and shiftable to drivably connect both devices, a first lever pivoted on one of the devices and connected to the member, a second lever pivoted on the last-named device and having a part shiftable relative thereto, spring means abutting on the second lever and acting to maintain the part in contact with an arm of the first lever, and means for operating the second lever to thereby load the spring means and actuate the first lever to shift the member to driving position, the arm having a portion shaped to releasably hold the part when the member is in neutral position.

6. In clutch mechanism, the combination of clutch devices connected to separate rotary parts, a clamping member connected to one of the devices and shiftable to drivably connect both devices, a lever pivoted on one of the devices and connected to the member, a spring cup pivoted on the last-named device, a stem slidably mounted on the cup and having at one end a roller, a helical spring encircling the stem seated on the cup and acting to maintain the roller in contact with an arm of the lever, and means for rocking the cup to thereby load the spring and actuate the lever to shift the member to driving position.

7. In clutch mechanism, the combination of clutch devices connected to separate rotary parts, a clamping member connected to one of the devices and shiftable to drivably connect both devices, a lever pivoted on one of the devices and connected to the member, a spring cup pivoted on the last-named device, a stem slidably mounted on the cup and having at one end a roller, a helical spring encircling the stem seated on the cup and acting to maintain the roller in contact with an arm of the lever, the contacted surface of the arm being angularly disposed to the axis of the stem, and means for rocking the cup to thereby load the spring and actuate the lever to shift the member to driving position, the contacted surface of the arm being substantially normal to the stem axis when the member is engaged.

8. In clutch mechanism, the combination of a pair of clutches, a clamping member common to both clutches and shiftable to engage either clutch, a lever having a pair of divergent arms pivoted on an element forming an engaged part of each clutch and connected to the member, spring actuated means rockable on the element to engage either arm, and means for rocking the spring actuated means in either direction to thereby actuate one of the lever arms to engage the associated clutch.

9. In clutch mechanism, the combination of a pair of clutches, a clamping member common to both clutches and shiftable to engage either clutch, a lever having a pair of divergent arms pivoted on an element forming an engaged part of each clutch and connected to the member, slidable means rockable on the element, spring means abutting on the element and acting to maintain the slidable means in contact with either arm, and means for rocking the slidable means in either direction to thereby load the spring means and actuate one of the lever arms to engage the associated clutch.

10. In clutch mechanism, the combination of a pair of clutches, a clamping member common to both clutches and shiftable to engage either clutch, a first lever having a pair of divergent arms pivoted on an element forming an engaged part of each clutch and connected to the member, a second lever pivoted on the element and having a part shiftable relative thereto, spring means abutting on the second lever and acting to maintain the part in contact with either lever arm, and means for operating the second lever in either direction to thereby load the spring means and actuate one of the lever arms to engage the associated clutch.

11. In clutch mechanism, the combination of a pair of clutches, a clamping member common to both clutches and shiftable to engage either clutch, a pair of levers pivoted on an element forming an engaged part of each clutch, one of the levers being connected to the member and having a pair of divergent arms and the other lever having a part shiftable relative thereto, spring means abutting on said other lever and acting to maintain the part in contact with either lever arm, and means for moving one of the levers relative to the other to thereby load the spring means and shift the member to engage either of the clutches.

12. In clutch mechanism, the combination of a pair of clutches, a clamping member common to both clutches and shiftable to engage either clutch, a lever having a pair of divergent arms pivoted on an element forming an engaged part of each clutch and connected to the member, a spring cup pivoted on the element, a stem slidably mounted on the cup and having at one end a roller, a helical spring encircling the stem seated on the cup and acting to maintain the roller in contact with either arm of the lever, and means for rocking the cup to thereby load the spring and actuate either arm of the lever to drivably connect the associated clutch.

13. In clutch mechanism, the combination of a pair of clutches, a clamping member common to both clutches and shiftable to engage either clutch, a lever having a pair of divergent arms pivoted on an element forming an engaged part of each clutch and connected to the member, a spring cup pivoted on the element, a stem slidably mounted on the cup and having at one end a roller, a helical spring encircling the stem seated on the cup and acting to maintain the roller in contact with either arm of the lever, and means for rocking the cup to thereby load the spring and actuate either lever arm to drivably connect the associated clutch, the contacted surface of the lever arm being substantially normal to the axis of the stem when the associated clutch is engaged.

14. In clutch mechanism, the combination of a pair of clutches, a clamping member common to both clutches and shiftable to engage either clutch, a first lever having a pair of divergent arms pivoted on an element forming an engaged part of each clutch and connected to the member, a second lever pivoted on the element and having a part shiftable relative thereto, spring means abutting on the second lever and acting to maintain the part in contact with either lever arm, and means for operating the second lever in either direction, the angular movement of the second lever being greater than the first lever whereby the spring means is loaded and one of the lever arms is actuated to engage the associated clutch.

PERCY H. BATTEN.
HENRY J. DUNKELOW.